UNITED STATES PATENT OFFICE.

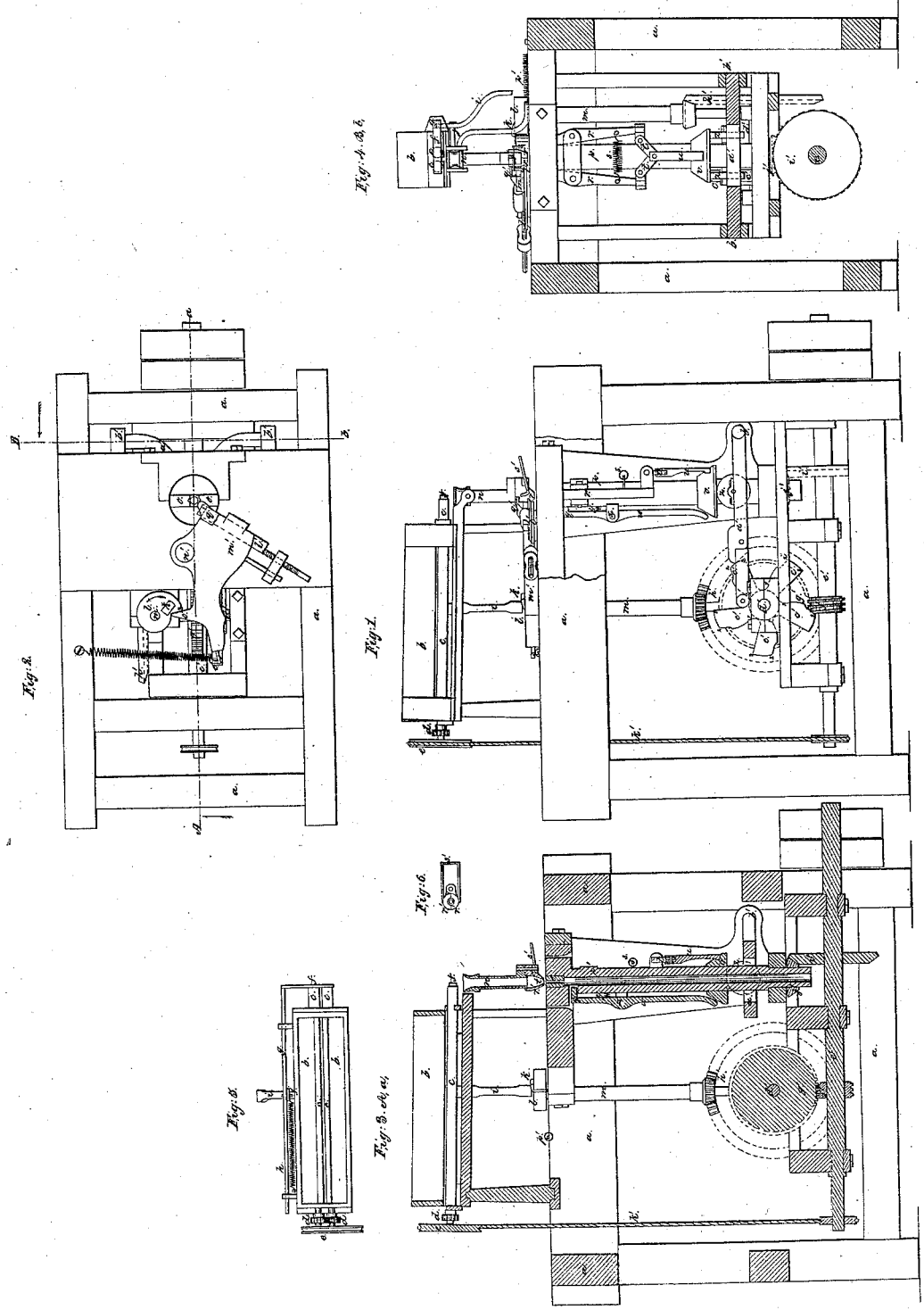

JOHN CRUM, OF RAMAPO, NEW YORK.

MACHINERY FOR SHAVING THE HEADS OF SCREW-BLANKS, RIVETS, &c.

Specification of Letters Patent No. 8,838, dated March 30, 1852.

*To all whom it may concern:*

Be it known that I, JOHN CRUM, of Ramapo, New York, have invented certain new and useful Improvements in Machinery for Shaving the Heads of Wood Screws, and that the following is a full, clear, and exact description thereof, reference being had to the accompanying drawings, making part of this specification, in which—

Figure 1, is a side elevation of the machine; Fig. 2, a plan with the feeding apparatus removed; Fig. 3, a longitudinal vertical section taken at the line A, $a$, of Fig. 2; Fig. 4, a cross vertical section taken at the line B, $b$, of Fig. 2; and Fig. 5, a separate plan of the feeding apparatus.

The same letters indicate like parts in all the figures.

In my improved machine the spindle or mandrel which carries the gripping jaws for holding and rotating the screw blanks is placed in a vertical position and is made hollow throughout its length for the free passage of the screw blanks, and there is combined therewith a movable stop or gage, which, when a blank is presented to the jaws and dropped between them determines the distance to which they shall descend to be gripped by the jaws, and which, when withdrawn on the opening of the jaws, permits the screw blanks to fall down freely through the said spindle and be thus discharged. There is also combined with the said hollow spindle or mandrel a feeding tube placed above the spindle and in line therewith which tube receives the screw blanks, and guides and delivers them in a proper direction to be gripped by the jaws, and is then moved out of the way by the approach of the cutter.

In the accompanying drawings $a$, represents the frame work which may be varied in any suitable manner at the discretion of the constructor. Above this frame is placed a hopper $b$, to receive the screw blanks and at the bottom there are two cutters $c$, $c$, placed at such distance apart as to permit the screw blanks to hang by their heads between the said rollers which are geared together at one end by means of pinions $d$, $d$, and one of them having a pulley $e$, to receive motion by a strap from some appropriate first mover so that by their slow rotary motion and their slight inclination the screw blanks are gradually moved toward the delivery end of the said rollers against a movable stop $f$, attached to a slide $g$, provided with a spring $h$, the tension of which keeps the said stop against the delivery end of the rollers to prevent the discharge of the blanks except at the required times. One end of a lever $i$, turning on a fulcrum pin at $j$, is jointed to the slide $g$, and its lower end is so placed as to be struck and operated by a cam $k$, on the upper face of a cam wheel $l$, fixed to the upper end of a vertical shaft $m$, and this motion of the lever and slide withdraws the stop $f$, just far, and long enough to permit one blank to fall vertically from the end of the rollers into a tube $n$, which directs the said blank to, and between the jaws $o$, $o$, which are jointed to the upper end of the spindle or mandrel $p$, until the point or end of the shank rests on a stop $q$, which determines the position of the blank preparatory to its being gripped by the jaws and rotated. The arms $r$, $r$, of the jaws are connected together by a spring $s$, the tension of which, tends to open them when permitted, and they are also connected together by a toggle joint lever $t$, which is in turn connected by a joint link $u$, with a slide $v$, on the mandrel, so that when this slide is elevated, the toggle joint lever is operated to close the jaws onto and forcibly grip the blank. The stop $q$, which gages the position of the screw blank works in a mortise in the mandrel and is attached to the upper end of a lever $w$, which turns on a fulcrum pin $x$, and its other end is acted upon by the slide $v$, which is of a conical form for the purpose of pushing the stop in its place, and when the slide descends it permits the stop to be withdrawn by the tension of a spring $y$, for the discharge of a blank. The lower face of the slide $v$, is flat and rests on two rollers $z$, $z$, in a lever $a'$, that is hung on bearing $b'$, $b'$. This lever has an opening in it through which the spindle or mandrel passes, so that the two rollers $z$, $z$, act on the under face of the slide $v$, one on each side of the spindle. The lever is forced up to push in the stop $q$, and to close the jaws by means of a series of cams $c'$, on a horizontal shaft $d'$. The form of each cam is such that from the point 1, to 2, they run out from the axis with a sudden curve to close the jaws, and then from 2 to 3, they are concentric to keep the jaws closed during the operation of the cutter, and then at the point 3 they suddenly run in, to permit the lever to descend and the jaws to be opened, and the stop withdrawn by the tension of the spring that the blank may be discharged through the hollow spindle.

The shaft $d'$, that carries the cams $c'$, receives motion from the main driving shaft $e'$, by a worm $f'$, (on the said driving shaft) the threads of which engage the cogs of a wheel $g'$, on the cam shaft. And this cam shaft is provided with a bevel wheel $h'$ which engages a bevel pinion on the vertical shaft $m$, so proportioned that the said vertical shaft shall make as many revolutions to one revolution of the cam shaft as there are cams $c'$, in the series. The main shaft communicates motion to the spindle or mandrel by a bevel cog wheel and pinion $i'$ $j'$, and to the rollers of the feeding apparatus by a band $k'$.

The cutter $l'$, for shaving the heads of screw blanks is properly mounted in a head $m'$, which turns on a vertical fulcrum pin $n'$. The arm $o'$, of the said head is kept by the tension of a spring $p'$ against the face of the cam $l$, on the vertical shaft $m$, which cam gradually recedes from the axis from the point 1, to 2, to force the cutter up to its work, and at 2, it suddenly runs in to permit the cutter to be withdrawn by the spring $p'$ and then for a short distance it is concentric to hold the cutter back during the discharge of the shaved, and gripping of a new blank.

The feeding tube is jointed at its upper end and the cutter stock or head is provided with a cam face $q'$, which, as the cutter approaches, strikes against and pushes the feeding tube out of the way of the cutter and on the return motion of the cutter head the feeding tube returns to its vertical position by gravity, or by the tension of a spring (if desired) to be in place to guide the next blank from the feed rollers to the jaws. The bore of the feeding tube is large enough for the free passage of the heads of the screw blanks, and at the lower end it is provided with two jaws $r'$, $r'$, (see Fig. 6 which is a view of the bottom end) which are together jointed to a pin on a projection from the side of, and at the lower end of the said tube. These two jaws are connected together by a spring $s'$, the tension of which tends to keep them closed but which admits of their being opened. The two faces of these jaws are cut away so that when closed there is a hole $t'$, of the size of the shanks of the blanks so that the blank shall be more accurately guided to the jaws and after they are gripped by the jaws and the cam face on the cutter head strikes the tube the jaws will be forced open to leave the blank and permit the cutter to act on it; the spring which connects the jaws permitting them to open. These jointed spring jaws I do not claim as any part of my invention as they have before been used in apparatus for feeding in the blanks. The said spring jaws or guides however may be dispensed with by making the said feeding tube so short that the screw blanks will leave or fall below it before being gripped by the jaws on the mandrel.

It will be seen that by making the mandrel hollow for the passage of the screws through the difficulties heretofore experienced in feeding the blanks to the jaws on the mandrel and discharging them will be in a great measure dispensed with, for by my improvement the blank in leaving the feeding tube is delivered to the jaws and when finished falls directly through the hollow mandrel in the same direction in which it is presented to the jaws—while in the machines heretofore made the discharge of a finished blank sometimes impedes the feeding or presenting of a new blank. And at the same time I am enabled to dispense with the mechanism heretofore employed for presenting the blank to the jaws of the mandrel.

It will be obvious from the foregoing that the construction of the parts and the inner arrangements may be greatly varied without changing the principle or character of my invention, and that the heads of rivets and all similar articles may be shaved by my above described machinery without any substantial change therein.

What I claim as my invention and desire to secure by Letters Patent is—

1. The movable stop which determines the position of the screw blanks between the jaws, and then returns to let said blanks fall through substantially as specified, in combination with the vertical hollow spindle or mandrel, as specified.

2. The feeding tube which conducts the screw blank &c. to the hollow spindle substantially as specified, in combination with the cam on the cutter head or its equivalent for moving the said tube out of the way of the cutter, as described.

JOHN CRUM.

Witnesses:
CONSTANT BROWNE,
WM. H. BISHOP.